(12) United States Patent
Ohashi et al.

(10) Patent No.: US 8,989,649 B2
(45) Date of Patent: Mar. 24, 2015

(54) RECORDING MATERIAL END POSITION DETECTION APPARATUS AND IMAGE FORMING APPARATUS

(75) Inventors: Eijiro Ohashi, Tokyo (JP); Haruki Ishibashi, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/991,597

(22) PCT Filed: Nov. 10, 2011

(86) PCT No.: PCT/JP2011/076591
§ 371 (c)(1),
(2), (4) Date: Jun. 4, 2013

(87) PCT Pub. No.: WO2012/077479
PCT Pub. Date: Jun. 14, 2012

(65) Prior Publication Data
US 2013/0259498 A1    Oct. 3, 2013

(30) Foreign Application Priority Data

Dec. 7, 2010 (JP) .................................. 2010-272704
Sep. 15, 2011 (JP) .................................. 2011-201837

(51) Int. Cl.
*G03G 15/00* (2006.01)
*G01B 11/14* (2006.01)
*B65H 7/02* (2006.01)

(52) U.S. Cl.
CPC *G01B 11/14* (2013.01); *B65H 7/02* (2013.01); *B65H 2403/532* (2013.01); *B65H 2511/20* (2013.01); *B65H 2511/212* (2013.01); *B65H 2511/514* (2013.01); *B65H 2511/518* (2013.01); *B65H 2553/412* (2013.01); *B65H 2553/81* (2013.01); *B65H 2701/1315* (2013.01); *B65H 2801/06* (2013.01)
USPC .......................................... 399/394; 250/235

(58) Field of Classification Search
CPC .................... B65H 2553/81; B65H 2403/532; B65H 2553/83
USPC ......................................................... 399/394
See application file for complete search history.

(56) References Cited

U.S. PATENT DOCUMENTS 5,082,384 A * 1/1992 Kakaguchi .................... 400/708
7,578,498 B2 * 8/2009 Iguchi et al. ................ 270/58.07

FOREIGN PATENT DOCUMENTS

| CN | 85105122 A | 12/1986 |
|---|---|---|
| CN | 101683935 A | 3/2010 |
| JP | 4-153149 A | 5/1992 |
| JP | 09-124187 A | 5/1997 |
| JP | 2002-053246 A | 2/2002 |

* cited by examiner

*Primary Examiner* — Ren Yan
*Assistant Examiner* — Justin Olamit
(74) *Attorney, Agent, or Firm* — Canon U.S.A., Inc. IP Division

(57) ABSTRACT

An rotation angle of a crank arm is calculated on the basis of a period of time in which a recording material is detected or a period of time in which the recording material is not detected and an end position of the recording material is calculated from the calculated rotation angle, so that detection of the end position of the recording material can be started regardless of a stop position of a sensor and the end position of the recording material can be accurately detected without using a dedicated drive source or member to reciprocate the sensor.

23 Claims, 15 Drawing Sheets

RECORDING MATERIAL END POSITION DETECTION APPARATUS AND IMAGE FORMING APPARATUS

TECHNICAL FIELD

The present invention relates to a recording material end position detection apparatus that detects an end position of a recording material and an image forming apparatus such as a copier, a printer, a facsimile, or a multi-function device including these devices, which includes an end position detection apparatus.

BACKGROUND ART

In a conventional image forming apparatus, a recording material such as a sheet is fed from a paper feeding cassette to an image forming portion by a feed roller and conveyed. The recording material may be conveyed while being skewed with respect to a conveying direction of the recording material due to various effects, such as a difference of the outer diameter of the conveying roller, a difference of the sheet conveyance speed due to wear of the conveying roller, and a frictional resistance between the recording material and a conveyance guiding member that guides the recording material. If a toner image on a photosensitive drum is transferred to the recording material while the recording material is conveyed in a skewed state, the image is printed in a skewed state with respect to the recording material. Therefore, there is an image forming apparatus in which a shutter member is provided to a pair of registration rollers or a pair of conveying rollers to suppress the skew of the recording material, the leading edge of the recording material is aligned by causing the leading edge of the recording material to come into contact with the shutter member, and then the recording material is conveyed to the image forming portion, so that the skew is suppressed. However, although the configuration for suppressing the skew by causing the leading edge of the recording material to come into contact with the shutter member is effective in a direction parallel to the conveying direction of the recording material, a position shift cannot be suppressed in a direction perpendicular to the conveying direction of the recording material. In a configuration for performing duplex printing, a recording material that has passed through a fixing unit to print a first surface contracts by heat and pressure from the fixing unit, so that the size of the recording material of a second surface becomes smaller than the size of the recording material of the first surface. Thus, the end position of the recording material may vary.

Therefore, there is an image forming apparatus which has a configuration for detecting a recording material end position in a direction parallel to the conveying direction of the recording material in order to suppress the position shift in the direction perpendicular to the conveying direction of the recording material. As a configuration for detecting a recording material end position, PTL 1 discloses a method in which a photo interrupter is moved across the recording material in a direction perpendicular to the conveying direction of the recording material and the recording material end position is detected by a distance from a datum point to a position from which the recording material blocks light. Also, PTL 1 discloses a method for correcting a position shift between the recording material and an image by relatively matching the position of the recording material with an image forming position.

CITATION LIST

Patent Literature

PTL 1 Japanese Patent Laid-Open No. 09-124187

SUMMARY OF INVENTION

Technical Problem

As described in Background Art, the end position of the recording material can be detected by how much the sensor moves from the datum point. However, to detect the end position of the recording material, it is necessary to obtain a distance over which the sensor moves from the datum point. Therefore, in an operation to detect the end position of the recording material, first, the sensor is moved to a position at which the datum point is detected, then the datum point is detected, and the end position of the recording material is detected. Therefore, to detect the end position of the recording material, it is necessary to move the sensor in two directions, which are a direction in which the sensor is moved to the datum point and a direction in which the sensor is moved to the end position of the recording material. Therefore, a dedicated drive source or a member for switching the drive is required, so that it causes the cost to go up.

The invention according to the present application is made in view of the above situation, and it is an object of the invention to accurately detect the end position of the recording material without using a dedicated drive source or member to reciprocate the sensor.

Solution to Problem

The present invention provides a recording material end position detection apparatus which includes a crank arm that is rotatably and pivotally supported, a crank arm drive unit that rotates the crank arm, a sensor unit connected to the crank arm, and a recording material detection sensor that is mounted on the sensor unit and detects the presence or absence of a recording material, and in which a position at which the recording material detection sensor detects an end portion of the recording material is calculated on the basis of a rotation angle by which the crank arm rotates in a period of time in which the recording material detection sensor detects that the recording material is present or a rotation angle by which the crank arm rotates in a period of time in which the recording material detection sensor detects that the recording material is absent.

Advantageous Effects of Invention

According to a configuration of the present invention, the detection of the end position of the recording material can be started regardless of a stop position of the sensor and the end position of the recording material can be accurately detected while reducing the time required for the detection.

DESCRIPTION OF EMBODIMENTS

Hereinafter, embodiments of the present invention will be described with reference to the drawings. The embodiments described below do not limit the invention according to the claims and all the combinations of the features described in the embodiments are not necessarily essential to the solutions of the invention.

First Embodiment

Figure 1:
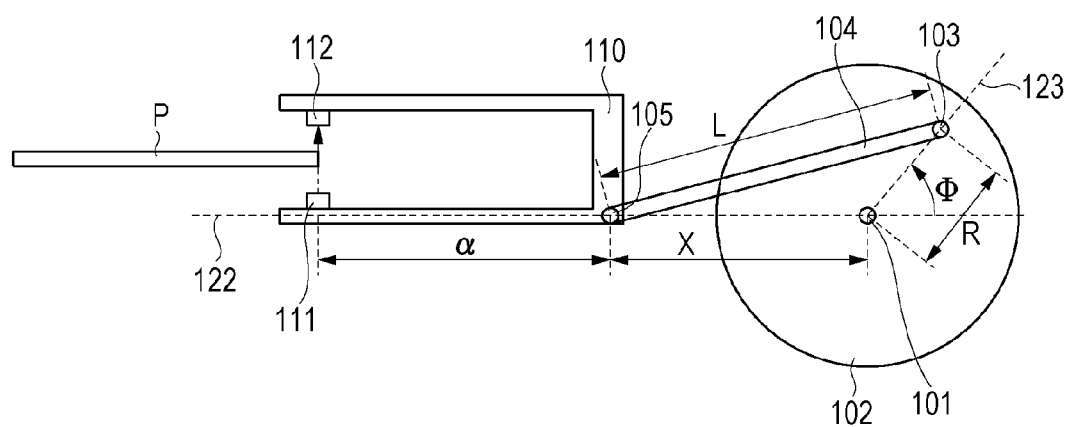
FIG. 1 is a diagram showing a configuration of a recording material end position detection apparatus according to a first embodiment.

FIG. 1 is a diagram showing a configuration of a recording material end position detection apparatus according to a first embodiment. The recording material end position detection apparatus has a crank arm 102 as a rotation member rotatably and pivotally supported by a crank shaft 101. Although the crank arm 102 is formed into a disk shape in FIG. 1, the crank arm 102 can be formed by a rod-shaped link member. One end of a connecting link 104 is rotatably connected to the crank arm 102 at a connecting portion 103 on the crank arm 102. A sensor unit 110 is connected to a connecting portion 105, which is the other end of the connecting link 104. The crank arm 102 is rotated by a crank arm drive unit (not shown in FIG. 1). The sensor unit 110 reciprocates on a straight line connecting the crank shaft 101 with the connecting portion 105. A light-emitting unit 111 and a light-receiving unit 112 of a recording material detection sensor are mounted on the sensor unit 110. The light-emitting unit 111 and the light-receiving unit 112 of the recording material detection sensor jointly form the recording material detection sensor. When the crank arm 102 rotates once, the sensor unit 110 reciprocates once.

Here, the light-emitting unit 111 and the light-receiving unit 112 face each other and form a transmission type sensor to detect the presence or absence of the recording material. However, it is also possible to arrange the light-emitting unit 111 and the light-receiving unit 112 on the same surface to form a reflection type sensor and detect the presence or absence of the recording material.

When there is no obstacle between the light-emitting unit 111 and the light-receiving unit 112 of the recording material detection sensor, the light-receiving unit 112 can receive light from the light-emitting unit 111. When there is a recording material P between the light-emitting unit 111 and the light-receiving unit 112, the light-receiving unit 112 cannot receive light because the light from the light-emitting unit 111 is blocked by the recording material P. Thereby, the recording material detection sensor can detect whether or not there is the recording material P on an optical path between the light-emitting unit 111 and the light-receiving unit 112. Also, the recording material detection sensor detects an output of the light-receiving sensor 112 and detects a changing point of the output, which means switching of the presence or absence of the recording material P, so that the recording material detection sensor can detect an end portion of the recording material P.

Figure 2A:
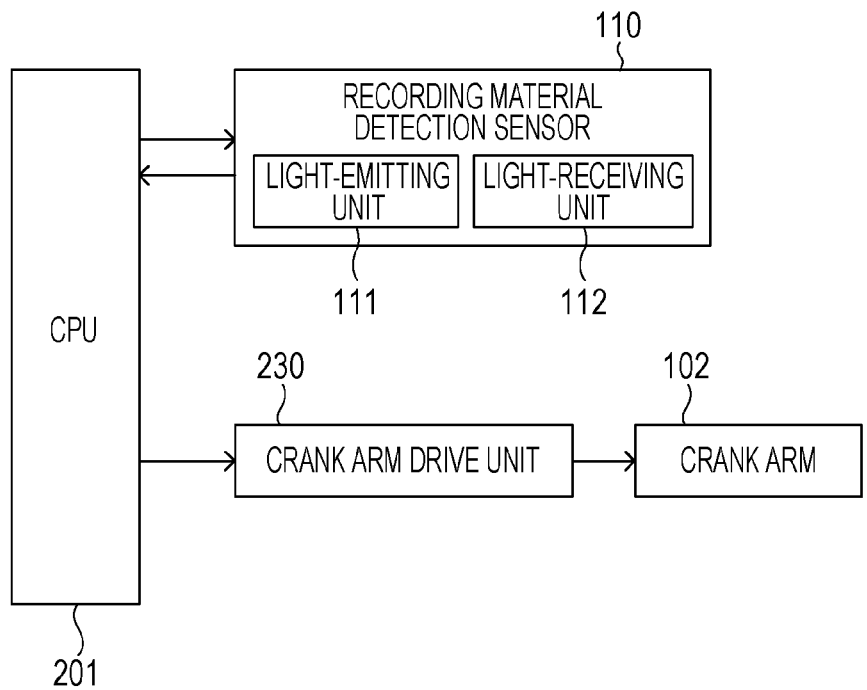
FIGS. 2A and 2B are block diagrams showing an operation control of the recording material end position detection apparatus according to the first embodiment.
Figure 2B:
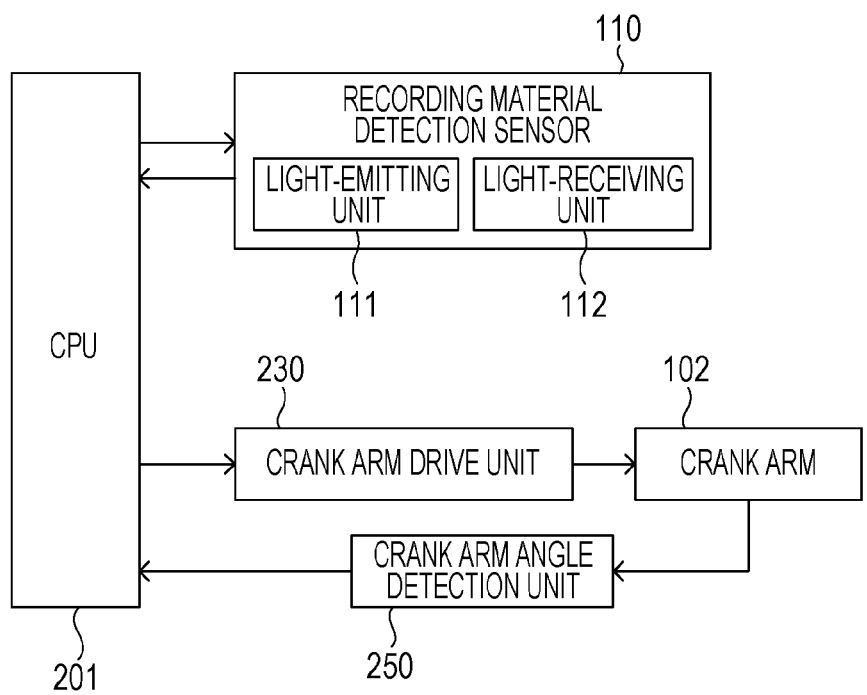

FIGS. 2A and 2B are examples of a block diagram showing an operation control of the recording material end position detection apparatus. In FIG. 2A, a CPU 201 is connected to the light-emitting unit 111 and the light-receiving unit 112 of a recording material detection sensor 110. The CPU 201 detects the output of the light-receiving unit 112 when the light-emitting unit 111 is turned on. When there is no recording material P between the light-emitting unit 111 and the light-receiving unit 112, the output of the light-receiving unit 112 becomes large, and an output value is detected as High. When there is the recording material P between the light-emitting unit 111 and the light-receiving unit 112, the output value of the light-receiving unit 112 becomes small because the light to the light-receiving unit 112 is blocked by the recording material P, so that the output value is detected as Low.

The CPU 201 controls an operation of the crank arm drive unit 230. The crank arm 102 is rotated by a driving force from the crank arm drive unit 230. The crank arm drive unit 230 is a rotary motor such as a stepping motor. The crank arm drive unit 230 can perform angle control and angular velocity control on the basis of a signal from the CPU 201. The CPU 201 can calculate a rotation angle of the crank arm 102 by a control signal transmitted to the crank arm drive unit 230. For example, the number of driving pulses to rotate a stepping motor 360 degrees is fixed, so that the rotation angle of the stepping motor can be calculated by the CPU 201 which counts the number of driving pulses of the stepping motor. If the driving force is transmitted from the stepping motor to the crank arm 102 directly or via a gear, the rotation angle of the crank arm 102 can be calculated on the basis of an angle of the stepping motor and a gear ratio.

As shown in FIG. 2B, the crank arm drive unit 230 can be a rotary motor such as a DC brush motor or a DC brushless motor. In this case, the rotation angle of the crank arm 102 is detected by a crank arm angle detection unit 250 and transmitted to the CPU 201. The CPU 201 can perform angle control and angular velocity control on the basis of a signal from the crank arm angle detection unit 250. Also, the CPU 201 can calculate a rotation angle of the crank arm 102 by a signal from the crank arm angle detection unit 250.

Figure 3:
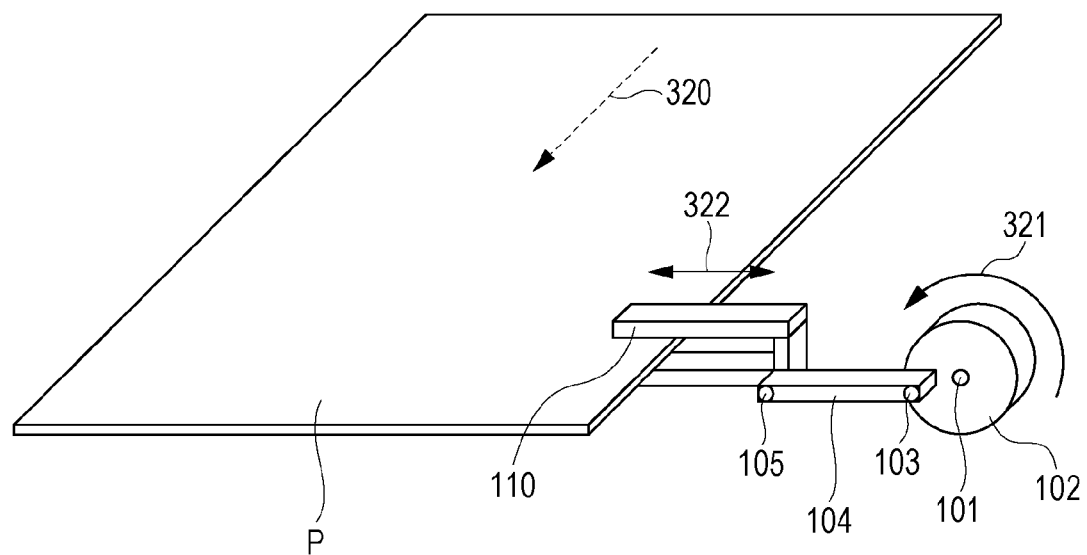
FIG. 3 is a diagram showing a state in which an end position of a recording material is detected according to the first embodiment.

FIG. 3 is a diagram showing a state in which an end position of the recording material is detected. The recording material P is conveyed in a direction indicated by an arrow 320. The recording material end position detection apparatus is disposed so that the sensor unit 110 reciprocates in a direction indicated by an arrow 322 perpendicular to the conveying direction of the recording material P. The crank arm 102 is pivotally supported by the crank shaft 101 and rotates in a direction indicated by an arrow 321. The crank arm 102 can rotate in a direction opposite to the direction indicated by the arrow 321. The crank arm 102 rotates in one direction while the crank arm 102 is detecting the end position of the recording material.

When the crank arm 102 is rotated by the crank arm drive unit, the sensor unit 110 reciprocates in the direction indicated by the arrow 322. When there is no recording material P on the optical path between the light-emitting unit 111 and the light-receiving unit 112, the output of the recording material detection sensor is High (hereinafter also referred to as "absence of recording material"). When there is the recording material P on the optical path between the light-emitting unit 111 and the light-receiving unit 112, the output of the recording material detection sensor is Low (hereinafter also referred to as "presence of recording material"). It can be said that an end portion of the recording material P is present on the optical path between the light-emitting unit 111 and the light-receiving unit 112 when the output of the sensor changes from High to Low or Low to High. Therefore, the sensor unit is arranged to be reciprocated so that the optical path between the light-emitting unit 111 and the light-receiving unit 112 of the recording material detection sensor passes through the end portion of the recording material, so that it is possible to detect the end position of the recording material in parallel with the conveying direction of the recording material. When the end position of the recording material P is detected, the recording material P may be being conveyed or may be stopped.

Next, a method for obtaining a distance from the crank shaft 101 to the connecting portion 105 of the sensor unit 110 will be described. As shown in FIG. 1, a distance between the crank shaft 101 and the connecting portion 103 is defined as R, and a length from the connecting portion 103 to the connecting portion 105 of the connecting link is defined as L. Further, an angle between a straight line 122 connecting the crank shaft 101 with the connecting portion 105 and a straight line 123 connecting the crank shaft 101 with the connecting portion 103 is defined as φ (hereinafter also referred to as "crank arm angle"). In this case, a distance X from the crank shaft 101 to the connecting portion 105 is represented by the following formula.

$$X = \sqrt{L^2 - R^2 \sin^2 \phi} - R \cos \phi \tag{1}$$

Therefore, if the crank arm angle φ is obtained, the position of the sensor unit 110 can be obtained. The distance from the crank shaft 101 to the end position of the recording material P can be calculated by obtaining the crank arm angle φ when the end portion of the recording material P is detected while the crank arm 102 is being rotated, the sensor unit 110 is being reciprocated, and the output value of the recording material detection sensor is being detected.

Figure 4:
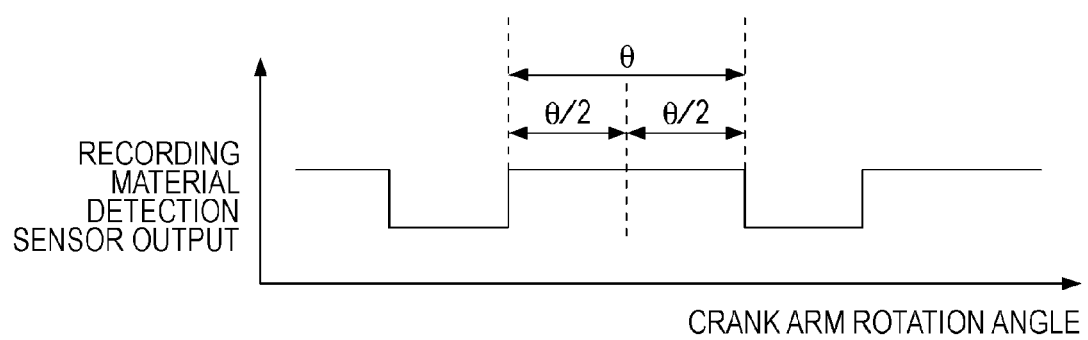
FIG. 4 is a graph showing an output value of a recording material detection sensor and a rotation angle of a crank arm according to the first embodiment.

FIG. 4 is a graph showing the output value of the recording material detection sensor and the rotation angle of the crank arm. As described above, the output value High of the recording material detection sensor indicates the absence of recording material, and the output value Low indicates the presence of recording material. The horizontal axis indicates the rotation angle of the crank arm. The rotation angle of the crank arm in a period of time in which the output value of the recording material detection sensor is High is defined as θ. Here, as an example, a stepping motor is used in the crank arm drive unit, so that the rotation angle θ of the crank arm in a predetermined period of time can be calculated by the CPU 201. In this way, the rotation angle θ of the crank arm is calculated in a period of time in which the output value of the recording material detection sensor is High.

Figure 5A:
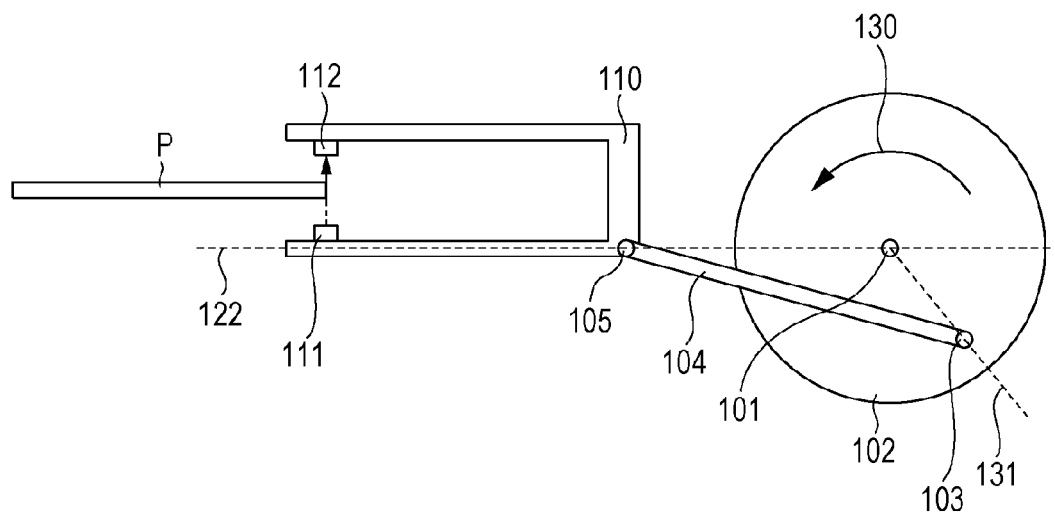
FIGS. 5A and 5B are diagrams showing an operation of the recording material end position detection apparatus according to the first embodiment.
Figure 5B:
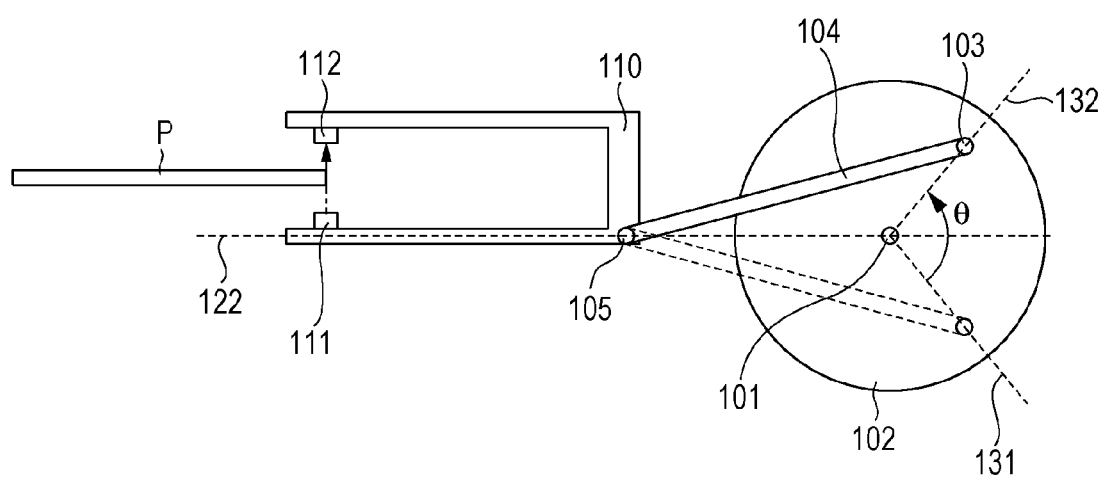

Next, a method for calculating the crank arm angle φ from the rotation angle θ of the crank arm will be described. As shown in FIG. 5A, if the crank arm 102 rotates in a direction indicated by an arrow 130, a straight line 131 connects the crank shaft 101 with the connecting portion 103 when the output value of the light-receiving unit 112 switches from Low to High. On the other hand, as shown in FIG. 5B, a straight line 132 connects the crank shaft 101 with the connecting portion 103 when the output value of the light-receiving unit 112 switches from High to Low. According to a geometric relationship of the crank mechanism, the straight line 131 and the straight line 132 are symmetrical to each other with respect to the straight line 122. Therefore, when the output value of the light-receiving unit 112 of the recording material detection sensor is High, the rotation angle θ of the crank arm is the same as an angle between the straight line 131 and the straight line 132 shown in FIG. 5B. The rotation angle θ can be calculated by the CPU, and a bisector of the rotation angle θ is the straight line 122.

The rotation angle θ of the crank arm can be calculated in this way, so that the crank arm angle φ can be obtained by halving the calculated rotation angle θ. When a value of ½ of the rotation angle θ of the crank arm is substituted for the crank arm angle φ in the formula (1), it is possible to obtain a distance Xs from the crank shaft 101 to the connecting portion 105 when the end portion of the recording material P is detected. In this case, Xs is represented by the following formula.

$$X_s = \sqrt{L^2 - R^2 \sin^2 \frac{\theta}{2}} - R \cos \frac{\theta}{2} \tag{2}$$

The distance from the crank shaft 101 to the end position of the recording material P can be obtained by adding a predetermined distance α from the connecting portion 105 to the optical path between the light-emitting unit 111 and the light-receiving unit 112 of the recording material detection sensor to the Xs, that is, by Xs+α.

In this way, the period of time while the recording material P is not detected by the recording material detection sensor is detected. The rotation angle of the crank arm is calculated from the period of time, so that the detection of the end position of the recording material can be started regardless of a stop position of the sensor. Thus, the end position of the recording material can be accurately detected without using a dedicated drive source or member to reciprocate the sensor.

Figure 6:
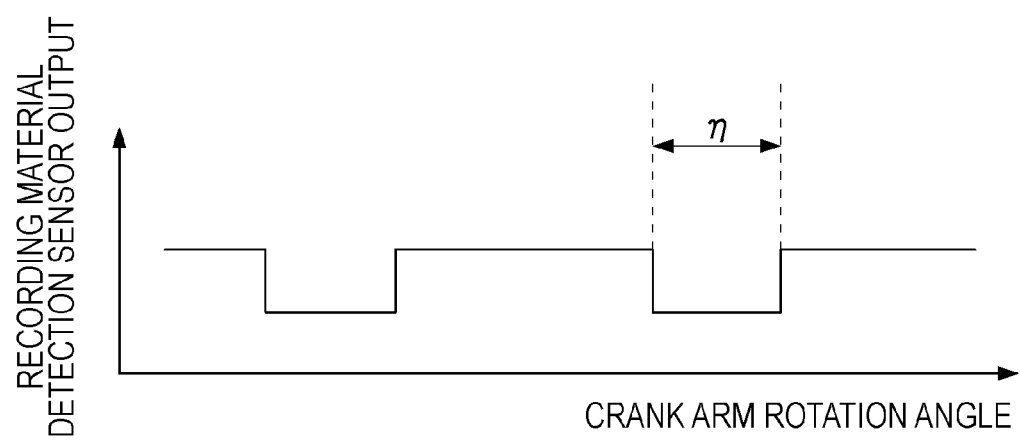
FIG. 6 is a graph showing an output value of the recording material detection sensor and a rotation angle of the crank arm according to the first embodiment.

Here, the period of time in which the output value of the light-receiving unit 112 is High is detected and the crank arm angle φ is calculated, and then the end position of the recording material is calculated. However, as shown in FIG. 6, the end position of the recording material can be also calculated by detecting a rotation angle η of the crank arm in a period of time in which the output value of the recording material detection sensor is Low. In the same way as the rotation angle θ of the crank arm, by halving the rotation angle η, the crank arm angle φ can be obtained. When a value of (π−η/2) is substituted for the crank arm angle φ in the formula (1), it is possible to obtain the distance Xs from the crank shaft 101 to the connecting portion 105 when the end portion of the recording material is detected. In this case, Xs is represented by the following formula.

$$X_s = \sqrt{L^2 - R^2\sin\left(\pi - \frac{\eta}{2}\right)} - R\cos\left(\pi - \frac{\eta}{2}\right) \quad (3)$$

The distance from the crank shaft 101 to the end position of the recording material P can be obtained by adding a predetermined distance α from the connecting portion 105 to the optical path between the light-emitting unit 111 and the light-receiving unit 112 of the recording material detection sensor to the Xs, that is, by Xs+α.

In this way, the period of time while the recording material is detected by the recording material detection sensor is detected. Then, the crank arm angle is calculated from the period of time, so that the detection of the end position of the recording material can be started regardless of a stop position of the sensor. Thus, the end position of the recording material can be accurately detected without using a dedicated drive source or member to reciprocate the sensor.

The rotation angle of the crank arm is calculated on the basis of a control signal transmitted from the CPU 201 to a stepping motor drive circuit. However, if the crank arm drive unit is controlled so that the crank arm is rotated at a substantially constant speed, the rotation angle of the crank arm can be calculated by measuring the time in which the absence of recording material or the presence of recording material is being detected by the recording material detection sensor as a rotation angle detection unit.

Second Embodiment

In the first embodiment, a method is described in which the period of time in which the recording material is detected by the recording material detection sensor is detected and the end position of the recording material is detected by calculating the crank arm angle from the period of time. In the present embodiment, a recording material detection sensor having a crank arm with a shape different from that of the crank arm of the first embodiment will be described. The same components as those of the first embodiment are given the same reference numerals and the description thereof will be omitted here.

Figure 7A:
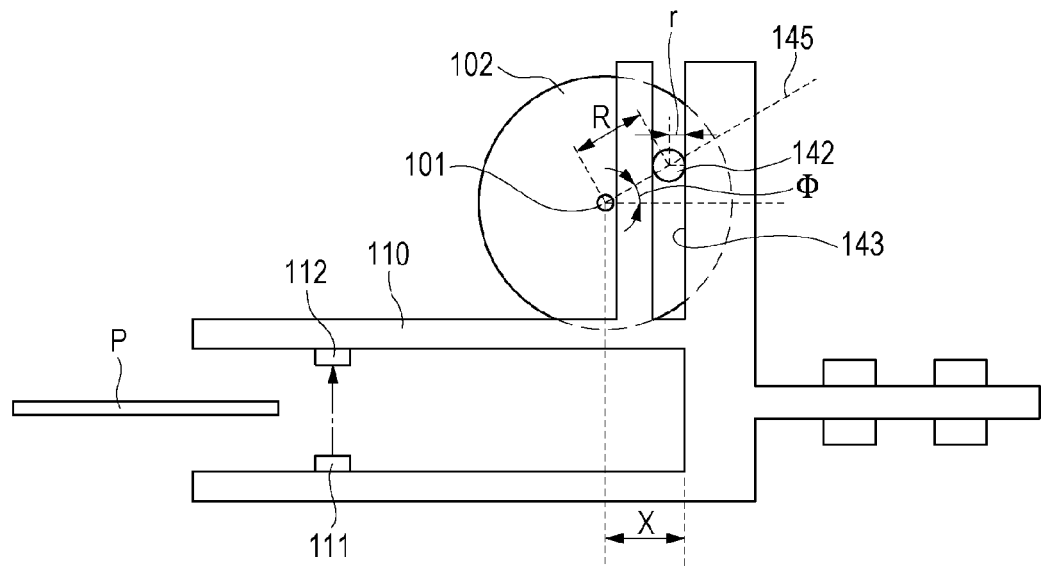
FIGS. 7A and 7B are diagrams showing a configuration of a recording material end position detection apparatus according to a second embodiment.

FIG. 7A is a diagram showing a configuration of a recording material end position detection apparatus according to a second embodiment. The recording material end position detection apparatus has a crank arm 102 rotatably and pivotally supported by a crank shaft 101. Although the crank arm 102 is formed into a disk shape in FIG. 7A, the crank arm 102 can be formed by a rod-shaped link member. The sensor unit 110 reciprocates on a straight line by a driving force applied from a contact portion 142 on the crank arm 102. The crank arm 102 is rotated by a crank arm drive unit (not shown in FIG. 7A). A light-emitting unit 111 and a light-receiving unit 112 of a recording material detection sensor are mounted on the sensor unit 110. The light-emitting unit 111 and the light-receiving unit 112 of the recording material detection sensor jointly form the recording material detection sensor.

A distance from the crank shaft 101 to a contact surface 143 of the sensor unit 110 can be obtained as described below. As shown in FIG. 7A, a distance between the crank shaft 101 and the center of the contact portion 142 is defined as R, and a distance from the center of the contact portion 142 to the contact surface 143 of the sensor unit 110 is defined as r. Further, when an angle formed by a straight line connecting the crank shaft 101 with the contact portion 142 is defined as φ (hereinafter also referred to as "crank arm angle"), a distance X from the crank shaft 101 to the contact surface 143 of the sensor unit 110 is represented by the following formula.

$$X = R\cos\Phi + r \quad (4)$$

In this case, if X has a negative value, the crank shaft 101 is located nearer to the recording material detection sensor than the contact surface 143, and if X has a positive value, the crank shaft 101 is located further from the recording material detection sensor than the contact surface 143. Thereby, if the crank arm angle φ is obtained, the position of the sensor unit 110 can be obtained. Further, the distance from the crank shaft 101 to the end position of the recording material P can be calculated by obtaining the crank arm angle φ when the end portion of the recording material P is detected while the crank arm 102 is being rotated, the sensor unit 110 is being reciprocated, and the output of the recording material detection sensor is being detected.

As described in the first embodiment, the value of the crank arm angle φ is ½ of the angle θ by which the crank arm rotates while the output of the light-receiving unit of the recording material detection sensor is High (absent of recording material). When a value of ½ of the rotation angle θ is substituted for the crank arm angle φ in the formula (4), it is possible to obtain a distance Xs from the crank shaft 101 to the contact surface 143 of the sensor unit 110 when the end portion of the recording material P is detected. In this case, Xs is represented by the following formula.

$$Xs = R\cos\frac{\theta}{2} + r \quad (5)$$

The distance from the crank shaft 101 to the end position of the recording material P can be obtained by adding a predetermined distance α from the contact surface 143 of the sensor unit 110 to the optical path between the light-emitting unit 111 and the light-receiving unit 112 of the recording material detection sensor to the Xs, that is, by Xs+α.

In this way, the period of time in which the recording material P is not detected by the recording material detection sensor is detected. Then, the crank arm angle is calculated from the period of time, so that the detection of the end position of the recording material can be started regardless of a stop position of the sensor. Thus, the end position of the recording material can be accurately detected without using a dedicated drive source or member to reciprocate the sensor.

In the same manner as in the first embodiment, the end position of the recording material can be also calculated by defining a rotation angle η of the crank arm in a period of time in which the output value of the recording material detection sensor is Low. When a value of (π−η/2) is substituted for the crank arm angle φ in the formula (4), it is possible to obtain the distance Xs from the crank shaft 101 to the contact surface 143 of the sensor unit 110 when the end portion of the recording material is detected. In this case, Xs is represented by the following formula.

$$Xs = R\cos\left(\pi - \frac{\eta}{2}\right) + r \quad (6)$$

The distance from the crank shaft 101 to the end position of the recording material P can be obtained by adding a predetermined distance α from the contact surface 143 to the optical path between the light-emitting unit 111 and the light-receiving unit 112 of the recording material detection sensor to the Xs, that is, by Xs+α.

Figure 7B:
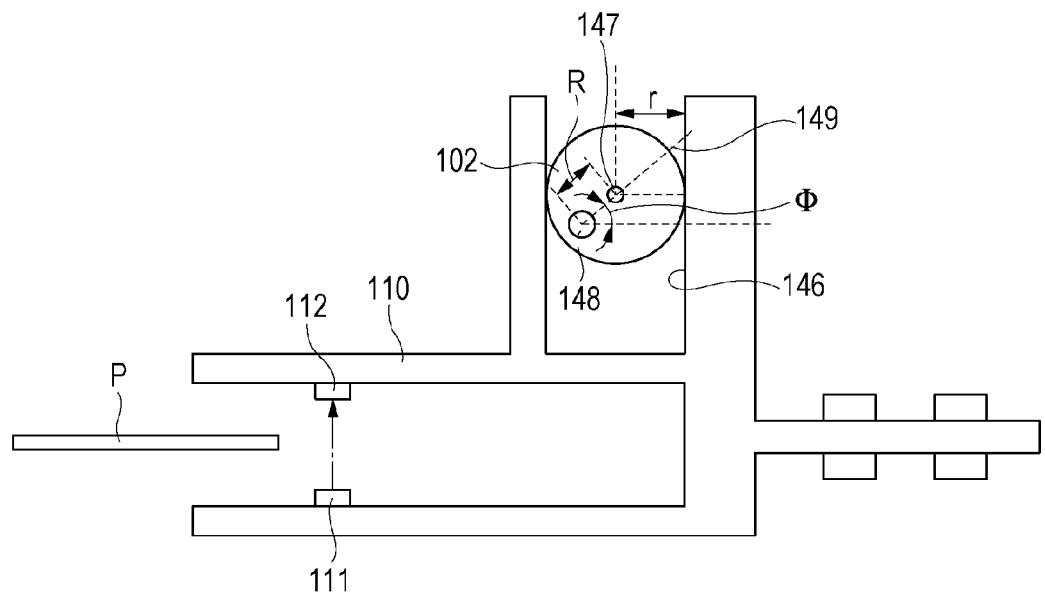

FIG. 7B is a modified example of FIG. 7A, and shows a configuration in which the crank arm center 147 does not correspond to the crank arm rotation center 148. In this case, a distance between the crank arm center 147 and the crank arm rotation center 148 is defined as R, and a distance from the crank arm center 147 to the contact surface 146 between the sensor unit 110 and the crank arm 102 is defined as r. Further, an angle formed by a straight line 149 connecting the crank arm center 147 with the crank arm rotation center 148 is defined as φ. When the angle φ and the above formulas (4) and (5) are used, it is possible to obtain a distance Xs from the crank shaft 101 to the contact surface 146 of the sensor unit 110 when the end portion of the recording material is detected. When a rotation angle of the crank arm in a period of time in which the output value of the recording material detection sensor is Low is defined as η, by using the above formula (6), it is possible to obtain the distance Xs from the crank shaft 101 to the contact surface 146 of the sensor unit 110 when the end portion of the recording material is detected.

Third Embodiment

In the first embodiment, a method is described in which the detection of the end position of the recording material can be started regardless of a stop position of the sensor and the end position of the recording material is detected without using a dedicated drive source or member to reciprocate the sensor. In the present embodiment, a method will be described in which the degree of detection accuracy of the end position of the recording material is improved by providing a flag and a flag detection sensor for improving the degree of detection accuracy of the end position of the recording material in addition to the recording material detection sensor in order to more accurately detect the end position of the recording material. The same components as those of the first embodiment are given the same reference numerals, and the description thereof will be omitted here.

Figure 8:
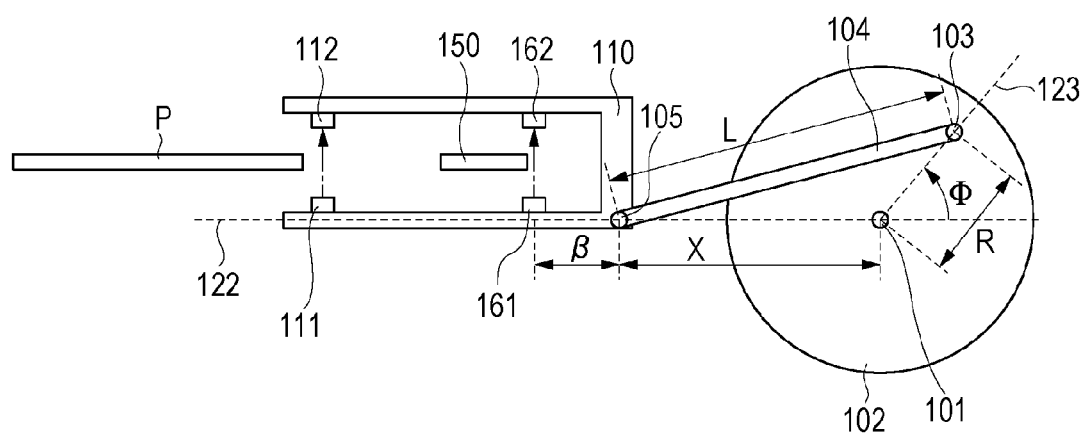
FIG. 8 is a diagram showing a configuration of a recording material end position detection apparatus according to a third embodiment.

FIG. 8 is a diagram showing a configuration of a recording material end position detection apparatus according to a third embodiment. A crank shaft 101, a crank arm 102, a connecting portion 103, a connecting link 104, and a connecting portion 105 of the recording material end position detection apparatus are the same as those in FIG. 1 of the first embodiment, so that the description thereof will be omitted.

A light-emitting unit 111 and a light-receiving unit 112 of a recording material detection sensor are mounted on the sensor unit 110. The light-emitting unit 111 and the light-receiving unit 112 of the recording material detection sensor jointly form the recording material detection sensor. A light-emitting unit 161 and a light-receiving unit 162 of the flag detection sensor are mounted at positions different from the position of the recording material detection sensor. The light-emitting unit 161 and the light-receiving unit 162 of the flag detection sensor are collectively referred to as "flag detection sensor".

A flag 150 is provided as a light shielding plate between the light-emitting unit 161 and the light-receiving unit 162 of the flag detection sensor. The flag 150 is disposed at a position different from a conveying path of the recording material P and does not affect the recording material and the recording material detection sensor. The flag 150 is not connected to the sensor unit 110 and fixed independently from the reciprocating operation of the sensor unit 110. In the flag detection sensor, when the sensor unit 110 reciprocates, if the flag 150 is present between the light-emitting unit 161 and the light-receiving unit 162, light is blocked, and if the flag 150 is absent, the light is received.

Figure 9:
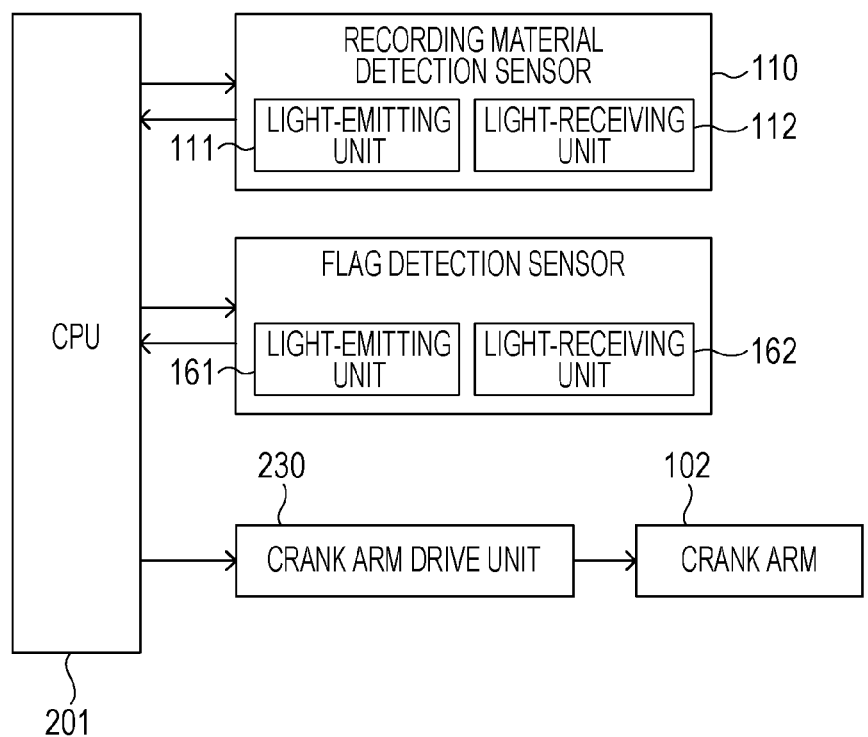
FIG. 9 is a diagram showing an operation control of the recording material end position detection apparatus according to the third embodiment.

FIG. 9 is an example of a block diagram showing an operation control of the recording material end position detection apparatus. In FIG. 9, a CPU 201 is connected to the light-emitting unit 111 and the light-receiving unit 112 of the recording material detection sensor 110 and the light-emitting unit 161 and the light-receiving unit 162 of the flag detection sensor. The CPU 201 detects an output of the light-receiving unit 112 when the light-emitting unit 111 of the recording material detection sensor is turned on and an output of the light-receiving unit 162 when the light-emitting unit 161 of the flag detection sensor is turned on. When the flag 150 is absent between the light-emitting unit 161 and the light-receiving unit 162, the output of the light-receiving unit 162 becomes High, and when the flag 150 is present between the light-emitting unit 161 and the light-receiving unit 162, the output of the light-receiving unit 162 becomes Low. The crank arm drive unit 230 and the crank arm 102 are the same as those in FIGS. 2A and 2B of the first embodiment, so that the description thereof will be omitted here.

Figure 10:
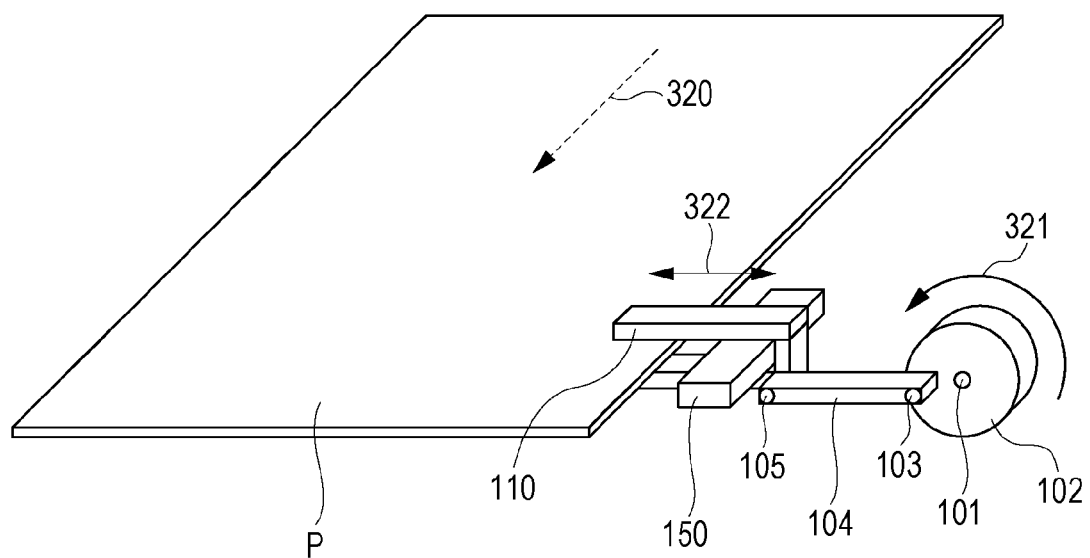
FIG. 10 is a diagram showing a state in which an end position of a recording material is detected according to the third embodiment.

FIG. 10 is a diagram showing a state in which an end position of the recording material P is detected. By this configuration, the end position of the recording material P and the flag 150 can be detected as the same time. A method for detecting the end position of the recording material P is the same as that shown in FIG. 3 of the first embodiment, so that the description thereof will be omitted here.

Figure 11:
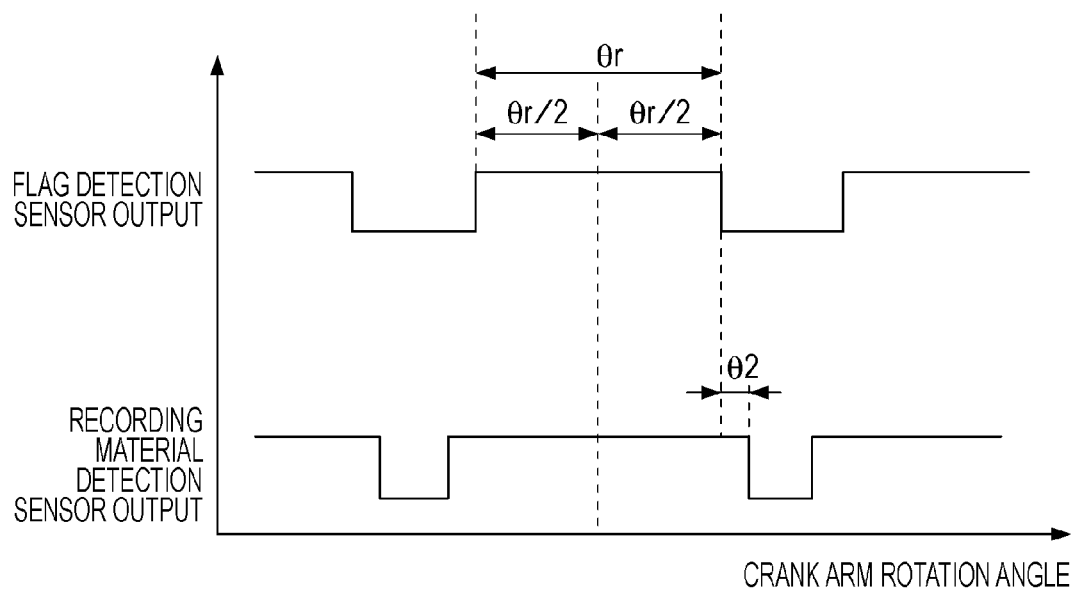
FIG. 11 is a graph showing output values of a recording material detection sensor and a flag detection sensor and a rotation angle of a crank arm according to the third embodiment.

FIG. 11 is a graph showing output values of the recording material detection sensor and the flag detection sensor and a rotation angle of the crank arm. The output value High of the recording material detection sensor indicates the absence of recording material, and the output value Low indicates the presence of recording material. The output value High of the flag detection sensor indicates the absence of flag, and the output value Low indicates the presence of flag. The horizontal axis indicates the rotation angle of the crank arm. The rotation angle of the crank arm in a period of time in which the output value of the flag detection sensor is High is defined as θr. Here, as an example, a stepping motor is used in the crank arm drive unit, so that the rotation angle θr of the crank arm in a predetermined period of time can be calculated by the CPU 201. When a value of ½ of the rotation angle θr of the crank arm is substituted for the crank arm angle φ in the formula (1) described in the first embodiment, it is possible to obtain a distance Xr from the crank shaft 101 to the connecting portion 105 when an end portion of the flag 150 is detected. In this case, Xr is represented by the following formula.

$$X_r = \sqrt{L^2 - R^2 \sin^2 \frac{\theta_r}{2}} - R\cos\frac{\theta_r}{2} \tag{7}$$

A distance from the crank shaft 101 to the end portion of the flag 150 can be obtained by adding a predetermined distance β from the connecting portion 105 to the optical path between the light-emitting unit 161 and the light-receiving unit 162 of the flag detection sensor to the Xr, that is, by Xr+β.

Further, a method for obtaining the rotation angle of the crank arm by using the recording material detection sensor is as described below. The CPU 201 calculates a rotation angle θ2 of the crank arm from when the output of the light-receiving unit 162 of the flag detection sensor switches from High to Low to when the output of the light-receiving unit 112 of the recording material detection sensor switches from High to Low. By adding θ2 to ½ of the obtained rotation angle θr, the distance Xr from the crank shaft 101 to the connecting portion 105 is calculated by the following formula.

$$Xr = \sqrt{L^2 - R^2\sin^2\left(\frac{\theta_r}{2} + \theta_2\right)} - R\cos\left(\frac{\theta_r}{2} + \theta_2\right) \quad (8)$$

A distance from the crank shaft 101 to the end portion of the flag 150 can be obtained by adding a predetermined distance β from the connecting portion 105 to the optical path between the light-emitting unit 161 and the light-receiving unit 162 of the flag detection sensor to the Xr, that is, by Xr+β.

In this way, the period of time in which the recording material P is not detected by the recording material detection sensor is detected, and the rotation angle of the crank arm is calculated from the period of time. Further, the end position of the recording material is calculated by calculating a rotation angle of the crank arm from the timing at which the flag 150 is detected by the flag detection sensor to the timing at which the recording material is detected by the recording material detection sensor. The flag 150 that is fixed in advance is detected and the end position of the recording material P is calculated on the basis of the flag 150, so that the basis for calculating the end position of the recording material P is clear. Thereby, the detection of the end position of the recording material can be started regardless of a stop position of the sensor. Thus, the end position of the recording material can be accurately detected without using a dedicated drive source or member to reciprocate the sensor.

Here, the period of time in which the output value of the light-receiving unit 162 is High is detected and the rotation angle of the crank arm is calculated. However, in the same manner as in the method described in the first embodiment, it is possible to obtain the end position of the recording material by detecting the period of time in which the output value is Low.

The rotation angle of the crank arm is calculated on the basis of a control signal transmitted from the CPU 201 to a stepping motor drive circuit. However, if the crank arm drive unit is controlled so that the crank arm is rotated at a substantially constant speed, the rotation angle of the crank arm can be calculated by measuring the time in which the presence or absence of the recording material is detected by the recording material detection sensor and the time in which the presence or absence of the flag is detected by the flag detection sensor and converting the time into an angle.

Fourth Embodiment

In the third embodiment, a method is described in which the detection accuracy of the end position of the recording material is improved in the configuration of the recording material detection sensor of the first embodiment. In the present embodiment, a method will be described in which the detection accuracy of the end position of the recording material is improved in the configuration of the recording material detection sensor of the second embodiment. The same components as those of the second embodiment are given the same reference numerals, and the description thereof will be omitted here.

Figure 12:
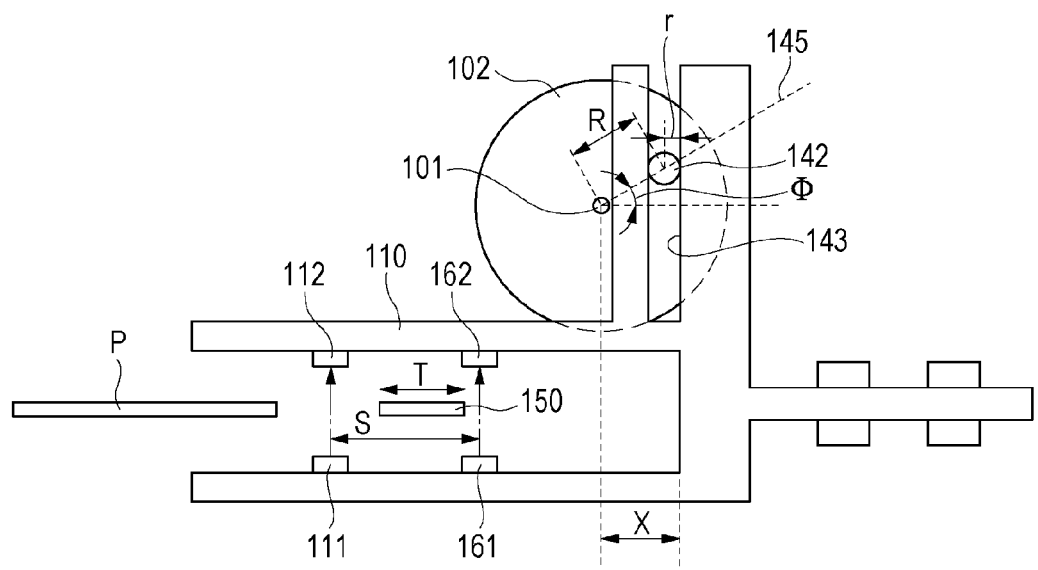
FIG. 12 is a diagram showing a configuration of a recording material end position detection apparatus according to a fourth embodiment.

FIG. 12 is a diagram showing a configuration of a recording material end position detection apparatus according to a fourth embodiment. A crank shaft 101, a crank arm 102, a contact portion 142, a contact surface 143, and the like of the recording material end position detection apparatus are the same as those in FIG. 7A of the second embodiment, so that the description thereof will be omitted.

A light-emitting unit 111 and a light-receiving unit 112 of a recording material detection sensor are mounted on the sensor unit 110. The light-emitting unit 111 and the light-receiving unit 112 of the recording material detection sensor jointly form the recording material detection sensor. A light-emitting unit 161 and a light-receiving unit 162 of a flag detection sensor are mounted at positions different from the position of the recording material detection sensor. The light-emitting unit 161 and the light-receiving unit 162 of the flag detection sensor are collectively referred to as "flag detection sensor".

A flag 150 is provided as a light shielding plate between the light-emitting unit 161 and the light-receiving unit 162 of the flag detection sensor. The flag 150 is disposed at a position different from a conveying path of the recording material P and does not affect the recording material and the recording material detection sensor. The flag 150 is not connected to the sensor unit 110 and fixed independently from the reciprocating operation of the sensor unit 110. Further, the flag 150 is disposed so that the length of the flag 150 is sufficiently smaller than the amplitude of the reciprocating motion of the sensor unit 110 and both ends of the flag 150 can be detected by the flag detection sensor. In the flag detection sensor, when the sensor unit 110 reciprocates, if the flag 150 is present between the light-emitting unit 161 and the light-receiving unit 162, light is blocked, and if the flag 150 is absent, the light is received.

Figure 13:
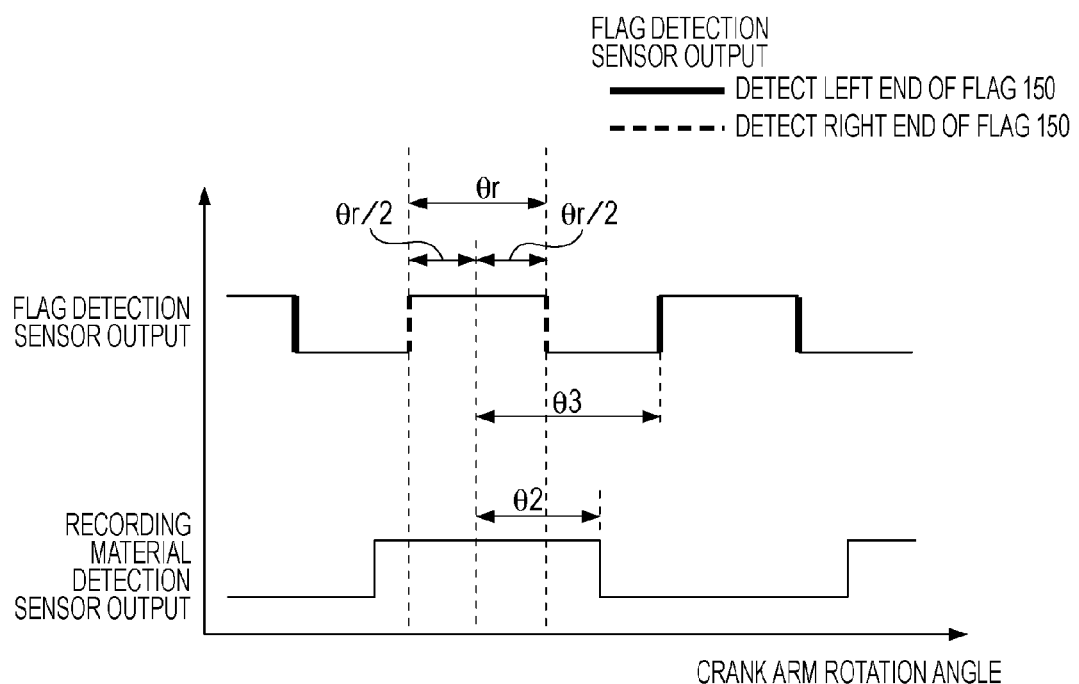
FIG. 13 is a graph showing output values of a recording material detection sensor and a flag detection sensor and a rotation angle of a crank arm according to the fourth embodiment.

FIG. 13 is a graph showing output values of the recording material detection sensor and the flag detection sensor and a rotation angle of the crank arm. The output value High of the recording material detection sensor indicates the absence of recording material, and the output value Low indicates the presence of recording material. The output value High of the flag detection sensor indicates the absence of flag, and the output value Low indicates the presence of flag. The horizontal axis indicates the rotation angle of the crank arm. The rotation angle of the crank arm in a period of time in which the output value of the flag detection sensor is High is defined as θr. Here, as an example, a stepping motor is used in the crank arm drive unit, so that the rotation angle θr of the crank arm in a predetermined period of time can be calculated by the CPU 201. The amplitude of the reciprocating motion of the sensor unit may be considered to calculate the end position of the recording material P by reducing influence of a tolerance of the distance R from the rotation center of the crank arm 102 to the center of the contact portion 142, an engage tolerance between the crank shaft 101 and the crank arm 102, and an engage tolerance between the contact portion 142 on the crank arm 102 and the contact surface 143. When the amplitude of the sensor unit is defined as A, the amount of movement X of the sensor unit is represented by the following formula.

$$X = A\cos\frac{\theta_r}{2} \quad (9)$$

When the rotation angle of the crank arm from ½ of the period of time in which the flag 150 is not detected to when the detection of the flag 150 is completed is defined as θ3 and the length of the flag 150 is defined as T, the amplitude A is represented by the following formula.

$$A = \frac{T}{\cos\frac{\theta_r}{2} - \cos\theta_3} \quad (10)$$

By using the formulas (9) and (10), the rotation angle θ2 in FIG. 13, and a distance S between the flag detection sensor and the recording material detection sensor, a distance Xp from the flag 150 to the end position of the recording material is represented by the following formula.

$$X_p = \left| \frac{T}{\cos\frac{\theta_r}{2} - \cos\theta_3} \right| \left( \cos\frac{\theta_r}{2} - \cos\theta_2 \right) + S \quad (11)$$

In this case, the end position of the flag 150 on the crank arm side is used as a reference, so that the distance from the reference of the flag 150 to the end position of the recording material is calculated by using a value of Xp when the amplitude A represented by the formula (10) is positive.

Thereby, the detection of the end position of the recording material can be started regardless of a stop position of the sensor. Thus, the end position of the recording material can be accurately detected without using a dedicated drive source or member to reciprocate the sensor. When the motion of the sensor unit can be represented by a linear expression of sine function or a linear expression of cosine function, the formulas described in the fourth embodiment can be applied regardless of the configuration of FIG. 7A.

Fifth Embodiment

In the first to the fourth embodiments, methods are described in which the detection of the end position of the recording material can be started regardless of a stop position of the sensor and the end position of the recording material is detected while reducing the time required for the detection. In the present embodiment, an image forming apparatus in which a sensor to detect an end position of a recording material can be mounted will be described.

Figure 14:
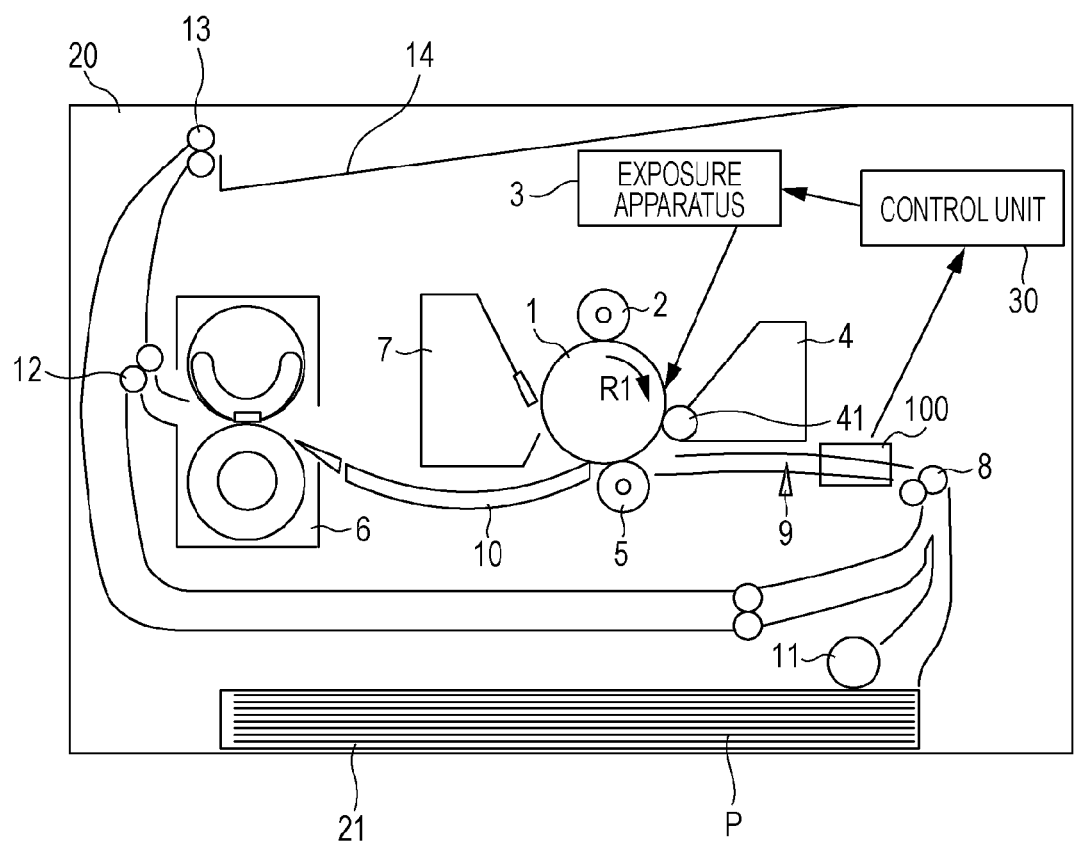
FIG. 14 is a schematic configuration diagram of an image forming apparatus.

FIG. 14 is a schematic configuration diagram of the image forming apparatus as an example of the present embodiment. Although a laser printer (hereinafter also referred to as "image forming apparatus") will be described as an example of the image forming apparatus, the image forming apparatus may be a copier, a printer, a facsimile, or a multi-function device of these devices.

An image forming apparatus 20 has a drum-shaped electrophotographic photosensitive member (hereinafter also referred to as "photosensitive drum") 1 as an image bearing member. The photosensitive drum 1 is rotatably supported and driven in a direction indicated by an arrow R1 by a driving unit (not shown in FIG. 14) at a predetermined process speed. A charging roller 2, an exposure apparatus 3, a developing apparatus 4, a transfer roller 5, and a cleaning apparatus 7 are sequentially arranged around the photosensitive drum 1 along the rotation direction thereof. A paper feeding cassette 21 accommodating recording materials P is disposed in a lower part of the image forming apparatus 20. Further, a feed roller 11, a conveying roller 8, a recording material end position detection apparatus 100, a top sensor 9, a conveyance guide 10, a fixing apparatus 6, a conveying roller 12, a discharge roller 13, a paper output tray 14 are sequentially arranged along a conveying path of the recording material P.

Next, an operation of the image forming apparatus having the above configuration will be described. The photosensitive drum 1 driven in the direction indicated by the arrow R1 by the driving unit (not shown in FIG. 14) is charged uniformly to a predetermined polarity and a predetermined potential by the charging roller 2. Exposure based on image information is performed on the surface of the charged photosensitive drum 1 by the exposure apparatus 3 including a laser scanner or the like. Thereby, charges on exposed portions are removed and an electrostatic latent image is formed. An operation of the exposure apparatus 3 is controlled by a control unit 30. The electrostatic latent image is developed by the developing apparatus 4. The developing apparatus 4 has a developing roller 41, applies a developing bias to the developing roller 41 to attach toner to the electrostatic latent image on the photosensitive drum 1, and develops the electrostatic latent image as a toner image (visualizes the electrostatic latent image).

The toner image is transferred to the recording material P by the transfer roller 5. The recording material P is accommodated in the paper feeding cassette 21, fed by the feed roller 11, conveyed by the conveying roller 8, and conveyed to a transfer nip portion between the photosensitive drum 1 and the transfer roller 5 through the recording material end position detection apparatus 100 and the top sensor 9. At this time, the leading edge of the recording material P is detected by the top sensor 9, and the recording material P is synchronized with the toner image on the photosensitive drum 1. A transfer bias is applied to the transfer roller 5. Thereby, the toner image on the photosensitive drum 1 is transferred to a predetermined position on the recording material P. The recording material P bearing an unfixed toner image on the surface thereof is conveyed along the conveyance guide 10 to the fixing apparatus 6, and the unfixed toner image is heated and pressed to be fixed onto the surface of the recording material P. When the toner image is fixed, the recording material P is conveyed by the conveying roller 12 and discharged to the paper output tray 14 by the discharge roller 13.

Figure 15:
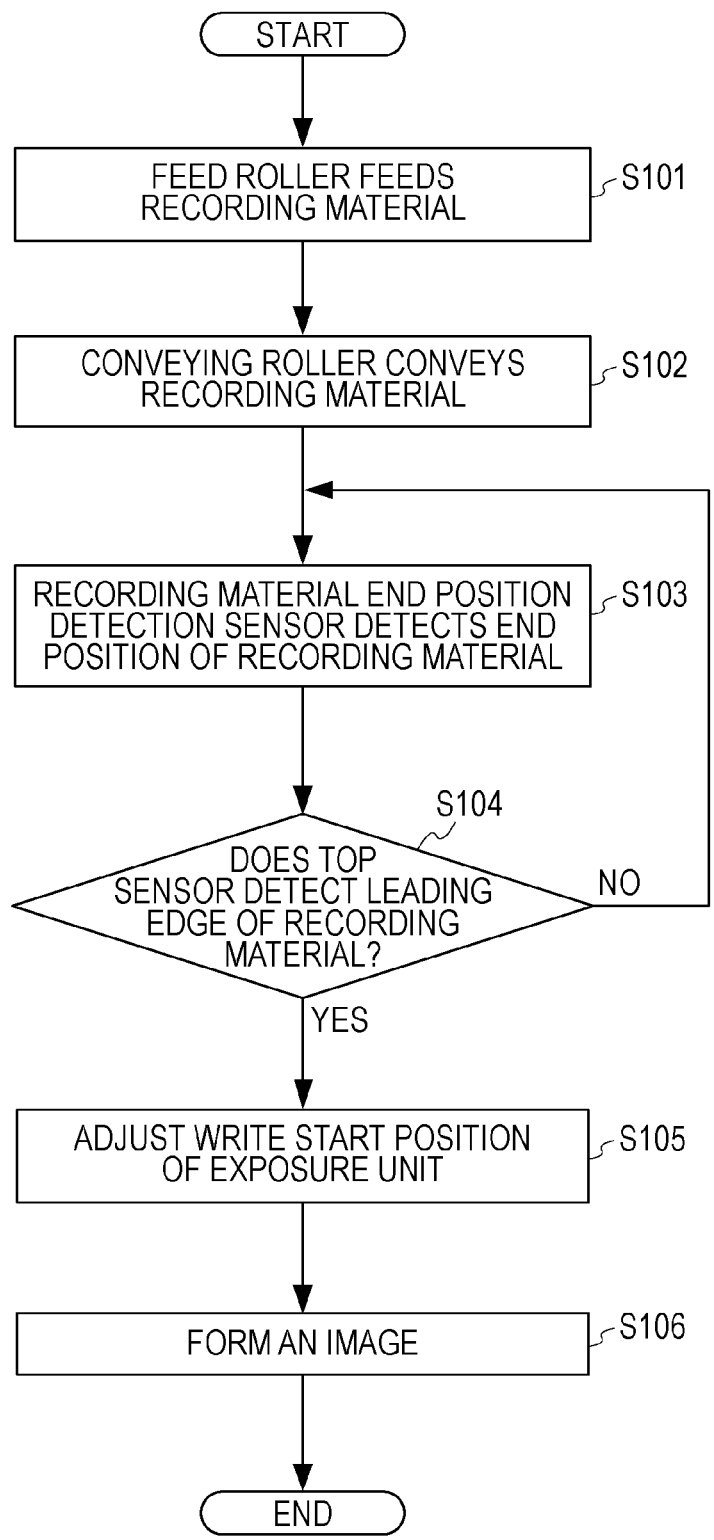
FIG. 15 is a flowchart for adjusting a write start position in a main scanning direction when an image is formed.

FIG. 15 is a flowchart for explaining a flow of adjusting a write start position in a main scanning direction when an image is formed. In S101, the feed roller 11 feeds the recording material P. In S102, the conveying roller 8 conveys the recording material P fed by the feed roller 11. In S103, the recording material end position detection apparatus 100 detects the end position of recording material P conveyed by the conveying roller 8 and transmits information of the end position to the control unit 30. The control unit 30 determines an adjustment amount of the image write start position in a direction (main scanning direction) perpendicular to the conveying direction of the recording material P on the basis of the information of the end position. In S104, the top sensor 9 detects the leading edge of the recording material P. In S105, the control unit 30 adjusts the image write start position in the main scanning direction of the exposure unit 3. Specifically, the control unit 30 obtains a difference between Xs+α or Xr+β obtained by the recording material end position detection apparatus 100 and a predetermined end position, and adjusts the image write start position. In S106, an image is formed by using the adjusted image write start position.

In an example of the present embodiment, the recording material end position detection apparatus 100 is disposed between the conveying roller 8 and the top sensor 9. However, the recording material end position detection apparatus 100 may be disposed at a position in the conveying path of the recording material, where the end position of the recording material P can be detected at a timing before the exposure apparatus 3 starts exposure of the photosensitive drum 1 and when the write start position in the main scanning direction can be adjusted. A drive source used for the recording material end position detection apparatus 100 is not limited to an independent drive source, but may be, for example, a drive source shared with the conveying roller 8.

As described above, the image forming apparatus having the recording material end position detection apparatus 100 can decrease a shift of the image with respect to the recording material by adjusting the image write start position even when the position of the recording material shifts in a direction perpendicular to the conveying direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-272704, filed Dec. 7, 2010 and No. 2011-201837, filed Sep. 15, 2011, which are hereby incorporated by reference herein in their entirety.

REFERENCE SIGNS LIST

- 100 recording material end position detection apparatus
- 101 crank shaft
- 102 crank arm
- 103 connecting portion
- 104 connecting link
- 105 connecting portion
- 110 sensor unit
- 111 light-emitting unit
- 112 light-receiving unit
- 150 flag
- 161 light-emitting unit
- 162 light-receiving unit
- 201 CPU
- P recording material

The invention claimed is:

1. A recording material end position detection apparatus, comprising:
    a rotating member configured to be rotated by a drive unit;
    a sensor unit connected to the rotating member and configured to reciprocate by a rotation of the rotating member;
    a recording material detection sensor mounted on the sensor unit configured to and detect a presence or absence of a recording material; and
    a control unit configured to calculate a rotation angle of the rotating member in a period of time in which the recording material detection sensor detects the presence or absence of the recording material while the sensor unit reciprocates by the rotation of the rotating member,
    wherein the recording material end position detection apparatus is configured to determine a position of a side end portion of the recording material with respect to a rotation center of the rotating member based on the rotation angle calculated by the control unit.

2. The recording material end position detection apparatus according to claim 1, further comprising:
    a connecting link configured to connect the rotating member with the sensor unit,
    wherein the rotating member is connected to one end of the connecting link and the sensor unit is connected to another end of the connecting link.

3. The recording material end position detection apparatus according to claim 2, wherein the recording material detection sensor reciprocates on a straight line connecting a connecting portion between the sensor unit and the connecting link with the rotation center of the rotating member.

4. The recording material end position detection apparatus according to claim 1, wherein the drive unit is a stepping motor.

5. The recording material end position detection apparatus according to claim 1, wherein the drive unit drives the rotating member to rotate in one direction while the presence or absence of the recording material is being detected by the recording material detection sensor.

6. The recording material end position detection apparatus according to claim 1, wherein the sensor unit reciprocates once every time the rotating member rotates once and the period of time in which the recording material detection sensor detects the presence or absence of the recording material is detected while the sensor unit reciprocates once.

7. The recording material end position detection apparatus according to claim 1, wherein the recording material end position detection apparatus determines the position of the side end portion of the recording material based on an angle obtained by halving a rotation angle by which the rotating member rotates in a period of time in which the recording material detection sensor detects that the recording material is present or a rotation angle by which the rotating member rotates in a period of time in which the recording material detection sensor detects that the recording material is absent.

8. The recording material end position detection apparatus according to claim 7, wherein
    when the angle obtained by halving the rotation angle by which the rotating member rotates in the period of time in which the recording material detection sensor detects that the recording material is absent is defined as $\theta/2$,
    a distance from the rotation center of the rotating member to a connecting portion between the rotating member and the connecting link is defined as R, and a distance from the connecting portion between the rotating member and the connecting link to a connecting portion between the connecting link and the sensor unit is defined as L,
    a distance $X_s$ from the rotation center of the rotating member to the connecting portion between the connecting link and the sensor unit when the recording material detection sensor detects the side end portion of the recording material can be obtained by the following formula:

$$X_s = \sqrt{L^2 - R^2 \sin^2 \frac{\theta}{2}} - R\cos\frac{\theta}{2}.$$

9. The recording material end position detection apparatus according to claim 7, wherein
    when the angle obtained by halving the rotation angle by which the rotating member rotates in the period of time in which the recording material detection sensor detects that the recording material is present is defined as $\eta/2$,
    a distance from the rotation center of the rotating member to a connecting portion between the rotating member and the connecting link is defined as R, and
    a distance from the connecting portion between the rotating member and the connecting link to a connecting portion between the connecting link and the sensor unit is defined as L,
    a distance $X_s$ from the rotation center of the rotating member to the connecting portion between the connecting link and the sensor unit when the recording material detection sensor detects the side end portion of the recording material can be obtained by the following formula:

$$X_s = \sqrt{L^2 - R^2\sin^2\left(\pi - \frac{\eta}{2}\right)} - R\cos\left(\pi - \frac{\eta}{2}\right).$$

10. The recording material end position detection apparatus according to claim 1, further comprising:
a rotation angle detection unit configured to detect a rotation angle by which the rotating member rotates,
wherein the control unit calculates the rotation angle of the rotating member in a period of time in which the recording material detection sensor detects the presence or absence of the recording material based on the rotation angle detected by the rotation angle detection unit.

11. The recording material end position detection apparatus according to claim 1, wherein the rotating member is a crank arm.

12. A recording material end position detection apparatus, comprising:
a rotating member configured to be rotated by a drive unit;
a sensor unit connected to the rotating member and configured to reciprocate by a rotation of the rotating member;
a recording material detection sensor mounted on the sensor unit and configured to detect a presence or absence of a recording material;
a flag fixedly positioned relative to the rotating member;
a flag detection sensor mounted on the sensor unit and configured to detect the presence or absence of the flag; and
a control unit configured to calculate a rotation angle of the rotating member in a period of time in which the flag detection sensor detects the presence of the flag and in which the recording material detection sensor detects the presence or absence of the recording material while the sensor unit reciprocates by the rotation of the rotating member,
wherein the recording material end position detection apparatus is configured to determine a position of a side end portion of the recording material with respect to a rotation center of the rotating member based on the rotation angle calculated by the control unit.

13. The recording material end position detection apparatus according to claim 12, further comprising:
a connecting link configured to connect the rotating member with the sensor unit,
wherein the rotating member is connected to one end of the connecting link and the sensor unit is connected to another end of the connecting link.

14. The recording material end position detection apparatus according to claim 13, wherein the recording material detection sensor reciprocates on a straight line connecting a connecting portion between the sensor unit and the connecting link with the rotation center of the rotating member.

15. The recording material end position detection apparatus according to claim 12, wherein the drive unit is a stepping motor.

16. The recording material end position detection apparatus according to claim 12, wherein the drive unit drives the rotating member to rotate in one direction while the presence or absence of the recording material is being detected by the recording material detection sensor.

17. The recording material end position detection apparatus according to claim 12, wherein the sensor unit reciprocates once every time the rotating member rotates once and the period of time in which the recording material detection sensor detects the presence or absence of the recording material is detected while the sensor unit reciprocates once.

18. The recording material end position detection apparatus according to claim 12, wherein the recording material end position detection apparatus determines the position of the side end portion of the recording material in the direction perpendicular to the conveying direction of the recording material based on an angle obtained by halving a rotation angle obtained from information related to an amount of rotation by which the rotating member rotates in a period of time in which the flag detection sensor detects that the flag is present.

19. The recording material end position detection apparatus according to claim 18, wherein
when the angle obtained by halving the rotation angle by which the rotating member rotates in the period of time in which the flag detection sensor detects that the flag is present is defined as $\theta_r/2$,
a distance from the rotation center of the rotating member to a connecting portion between the rotating member and the connecting link is defined as R, and
a distance from the connecting portion between the rotating member and the connecting link to a connecting portion between the connecting link and the sensor unit is defined as L,
a distance $X_r$ from the rotation center of the rotating member to the connecting portion between the connecting link and the sensor unit when the flag detection sensor detects an end portion of the flag can be obtained by the following formula:

$$X_r = \sqrt{L^2 - R^2\sin^2\frac{\theta_r}{2}} - R\cos\frac{\theta_r}{2}$$

and when the rotation angle by which the rotating member rotates in the period of time in which the recording material detection sensor detects that the recording material is present is defined as $\theta_2$,
a distance $X_r$ from the rotation center of the rotating member to the connecting portion between the connecting link and the sensor unit when the recording material detection sensor detects the side end portion of the recording material can be obtained by the following formula:

$$X_r = \sqrt{L^2 - R^2\sin^2\left(\frac{\theta_r}{2} + \theta_2\right)} - R\cos\left(\frac{\theta_r}{2} + \theta_2\right).$$

20. The recording material end position detection apparatus according to claim 12, further comprising:
a rotation angle detection unit configured to detect a rotation angle by which the rotating member rotates,
wherein the control unit calculates the rotation angle of the rotating member in a period of time in which the recording material detection sensor detects the presence or absence of the recording material based on the rotation angle detected by the rotation angle detection unit.

21. The recording material end position detection apparatus according to claim 12, wherein the rotating member is a crank arm.

22. An image forming apparatus, comprising:
- an image forming unit configured to form an image on a recording material;
- a rotating member configured to be rotated by a drive unit;
- a sensor unit connected to the rotating member and configured to reciprocate by a rotation of the rotating member;
- a recording material detection sensor mounted on the sensor unit and configured to detect a presence or absence of the recording material;
- a first control unit configured to calculate a rotation angle of the rotating member in a period of time in which the recording material detection sensor detects the presence or absence of the recording material while the sensor unit reciprocates by the rotation of the rotating member; and
- and a second control unit which controls an image write start position of the image forming unit,
- wherein the recording material end position detection apparatus is configured to determine a position of a side end portion of the recording material with respect to a rotation center of the rotating member based on the rotation angle calculated by the first control unit and the second control unit adjusts the image write start position of the image forming unit based on the position of the side end portion of the recording material.

23. An image forming apparatus, comprising:
- an image forming unit configured to form an image on a recording material;
- a rotating member configured to be rotated by a drive unit;
- a sensor unit connected to the rotating member and configured to reciprocate by a rotation of the rotating member;
- a recording material detection sensor mounted on the sensor unit and configured to detect a presence or absence of a recording material;
- a flag fixedly positioned relative to the rotating member;
- a flag detection sensor mounted on the sensor unit and configured to detect the presence or absence of the flag;
- a first control unit configured to calculate a rotation angle of the rotating member in a period of time in which the flag detection sensor detects the presence of the flag and in which the recording material detection sensor detects the presence or absence of the recording material while the sensor unit reciprocates by the rotation of the rotating member; and
- and a second control unit which controls an image write start position of the image forming unit,
- wherein the recording material end position detection apparatus is configured to determine a position of a side end portion of the recording material with respect to a rotation center of the rotating member based on the rotation angle calculated by the first control unit and the second control unit adjusts the image write start position of the image forming unit based on the position of the side end portion of the recording material.

* * * * *